May 1, 1951  E. R. ORLING  2,551,155
MEAT CONVEYER
Filed Sept. 12, 1945  2 Sheets-Sheet 1
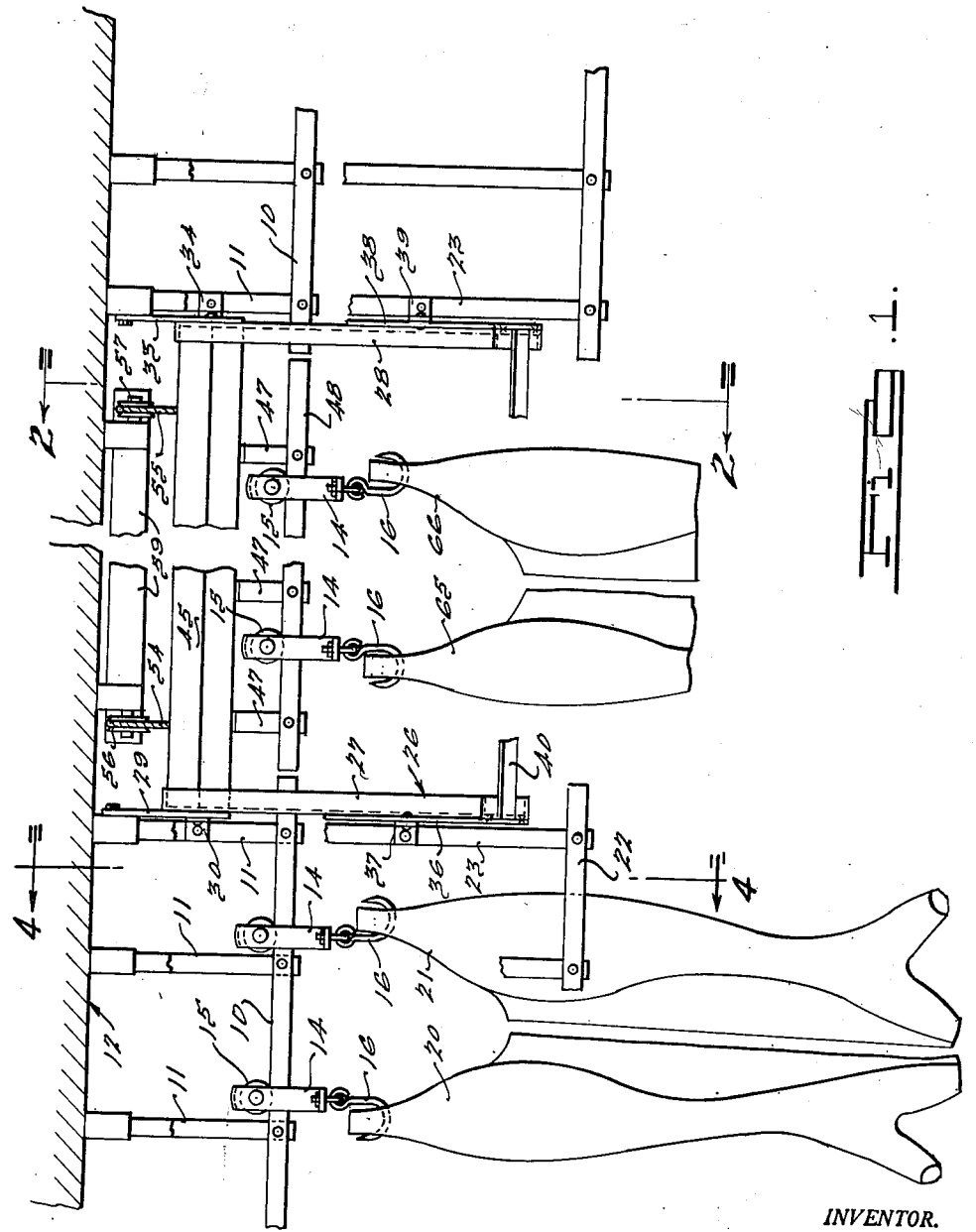
INVENTOR.
Ernest R. Orling.
BY
Harness, Dickey & Pierce
ATTORNEYS.

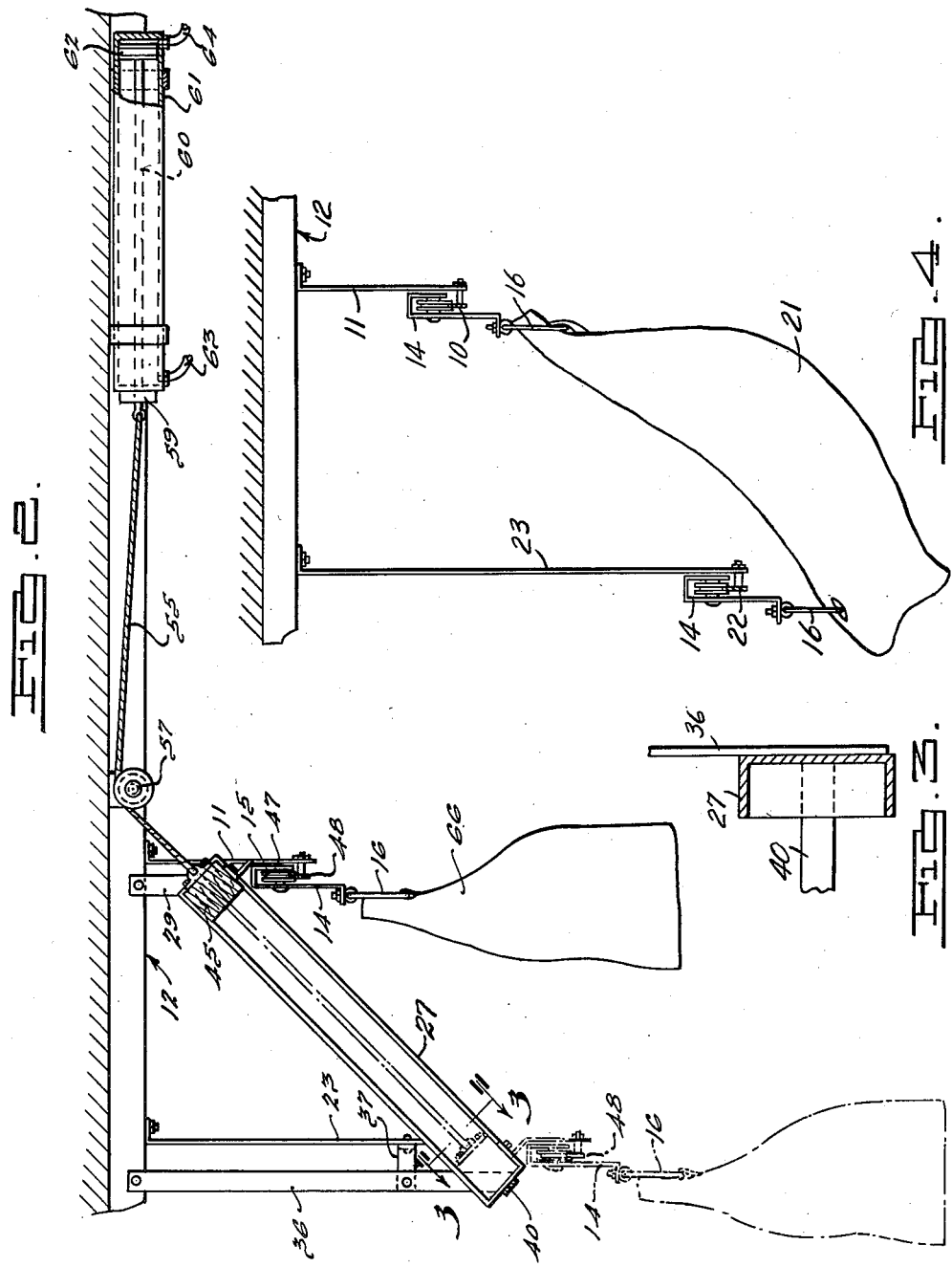

Patented May 1, 1951

2,551,155

UNITED STATES PATENT OFFICE 2,551,155

MEAT CONVEYER

Ernest R. Orling, Detroit, Mich.; Herbert H. Schoenberg executor of said Ernest R. Orling, deceased Application September 12, 1945, Serial No. 615,727

3 Claims. (Cl. 104—96)

The invention relates to the meat processing industry and it has particular relation to a conveying apparatus for conveying meat.

In the meat processing industry it is usual practice to convey sides of beef or other animals along a conveyer from which the sides are suspended to a point where such sides are to be transversely cut into quarter sections and transferred to a lower conveyer. Heretofore it has been customary in effecting this operation to hook the lower end of the side of beef to the lower conveyer while it is still hooked to the upper conveyer and then to cut it into two quarters. This allows the lower quarter then to be swung downwardly and to be suspended from the lower conveyer. Following this operation the upper quarter suspended from the upper conveyer is lifted and unhooked from the latter and manually lowered and hooked on to the lower conveyer. Very little effort is required in so hooking the lower quarter to the lower conveyer but with respect to the upper quarter, considerable manual effort is required in lifting the upper quarter from its hook and lowering it to the lower conveyer and hooking it thereto.

One object of the present invention is to provide a conveyer apparatus which will facilitate the transfer of the upper quarters of beef from the upper conveyer in a system such as mentioned above.

Another object of the invention is to provide a conveyer apparatus for lowering the upper quarter of beef to the lower conveyer without necessitating any manual lifting operation such as heretofore required.

Another object of the invention is to provide an auxiliary lowering apparatus for lowering the upper quarters of beef to the lower conveyer wherein power devices may be employed so as to reduce the labor heretofore required in this meat transferring operation.

Other objects of the invention will become apparent from the following specification, from the drawings relating thereto, and from the claims hereinafter set forth.

For a better understanding of the invention reference may be had to the drawings wherein:

Figure 1 is a side elevational view of meat transferring means constructed according to one form of the invention;

Fig. 2 is a cross-sectional view taken substantially along the line 2—2 of Fig. 1;

Fig. 3 is a cross-sectional view taken substantially along the line 3—3 of Fig. 2; and, Fig. 4 is a cross-sectional view of the structure illustrated in Fig. 1, taken along the line 4—4 thereof and showing the lower end of the side of beef swung over to and secured to a hanger on the lower track.

Referring to Fig. 1, an upper conveyer is indicated at 10 and is shown as supported by bars 11 depending from a ceiling or other beam supports 12. The conveyer 10 may be in the form of a steel rail or track and articles to be moved along the conveyer may be supported on hangers 14 having rollers 15 movable along the upper edge of the rail. Usually these rollers have grooves so that they will be maintained on the track. At their lower ends the hangers have hooks 16 adapted to be hooked through the end of the side of beef being transferred on the conveyer. As shown at the left in Fig. 1, two hangers 14 support respectively two sides of beef indicated at 20 and 21, and it should be understood that at some previous point on the conveyer the beef is cut lengthwise or split into the two sides shown.

A second conveyer track 22 is provided substantially below the track 10 and this second track is supported by bars 23 also depending from the ceiling or other support 12. This track is offset laterally from the track 10, as best shown in Fig. 2, and is indicated heretofore, it is desirable to cut the sides of beef 20 and 21 transversely into upper and lower quarters and to have all four quarters carried on the lower conveyer. The first step in effecting this operation is to hook the lower end of each side of beef to a hanger 14 on the lower conveyer while the upper end is still connected to hanger 14 on the upper track. This is done merely by swinging the lower end of the beef over and hooking it onto a hanger on the lower track, and is illustrated in Fig. 4. When so engaged by upper and lower hangers, the side of beef is cut transversely in quarters and this then allows the lower quarter to be swung downwardly and to then be suspended from the lower track. This operation is effected at the left of the apparatus shown in Fig. 1 in the region shown occupied by the two sides of beef.

With the lower quarters now suspended from the lower conveyer track 22 and the upper quarters still suspended from the upper conveyer, the apparatus now to be described and which comprises the present invention, provides means for transferring the upper quarters from the upper track 10 to the lower track 22 so that all four quarters will be carried by the lower track. The means provided for obtaining this result comprises a box-like frame indicated at 26 generally, and this frame includes a pair of channels 27 and 28 having their open sides next to each other so as to provide a pair of oppositely disposed, obliquely and upwardly extending guideways. The channel 27 is connected at its upper end to a bar 29 in turn connected to the ceiling or upper support 12 and this bar may additionally be supported by a brace 30 connecting it to one of the bars 11. Similarly the channel 28 is connected at its upper end to a bar 23 connected to the ceiling support 12 and likewise, a brace indicated at 34 may be used to connect the bar 23 to one of the bars 11.

At its lower end the channel 27 is supported by a bar 36 also depending from the ceiling 12 as shown best by Fig. 2 and this bar may be re-enforced by a brace 37 connecting it to the bar 23. The lower end of channel 28 similarly may be connected to a bar 38 depending from the ceiling and a brace 39 connects this bar to another of the bars 23. A cross bracing bar 40 is provided at the lower ends of the channels for connecting them and if desired, a similar cross-bracing bar may be provided at the upper ends of the channels. The construction described provides two obliquely arranged and parallel channels which are fixed in position.

A slide or cross-head 45 has its ends projecting into the channels thus provided and it follows that this slide is movable in the oblique plane of the channels. Intermediate its ends, the slide has depending brackets or bars 47 which carry a track section 48 at their lower ends. This track section is so arranged that with the slide 45 at the upper end of the channels, it is aligned with the track section 10 and it may be observed at this time that the track section 10 is interrupted sufficiently to permit the track section 48 to move into a position between the ends of the interrupted section. The auxiliary track section 48 is adapted to support rollers 15 and hangers 14 in the same manner as previously described with respect to the track sections 10 and 22. The lower track 22 is likewise interrupted in the same manner as the upper track 10 and the arrangement of parts is such that when the slide 45 is allowed to move downwardly in the oblique plane mentioned, it will when in its lower position cause the auxiliary track section 48 to became aligned with the ends of the track section 22.

The slide 45 is adapted to be moved upwardly and downwardly by suitable power means and as shown by Figs. 1 and 2, this power means may comprise cables 54 and 55 connected to the slide 45 and which are trained about pulleys 56 and 57 supported on the ceiling structure 12. The cables 54 and 55 are connected to a suitable cross bar 59 in turn connected to a piston rod 60 extending into a cylinder 61, and within the cylinder the rod 60 is connected to a piston 62. This piston is adapted to be reciprocated by fluid pressure delivered to one end of the cylinder or the other through pipes 63 and 64. Suitable valve means may be provided for controlling operation of the fluid pressure device and the control may be located near the conveyer so that the operator may readily govern movement of the slide 45.

In Fig. 1 the auxiliary track 48 is shown as carrying a pair of beef quarters 65 and 66 which correspond to the upper sections of the two sides of beef 20 and 21 shown at the left in Fig. 1. In other words, after the sides of beef are cut into quarters, the upper sections are moved onto the auxiliary track 48. Then by operating the fluid pressure device, the slide 45 is lowered until the track 28 is in line with the track 22 and then the quarters of beef are moved onto the track 22. After the transfer to track 22 the slide 45 is raised so as to be in a position for the next transfer.

It should be apparent from the foregoing that the lower quarters are transferred readily to track 22 by hooking the lower ends of the sides of beef to the hangers on track 22 and then severing the sides into quarters and allowing the lower quarters to swing downwardly and to be suspended from track 22. Then the upper quarters are moved onto the track 48 and the latter is lowered by the fluid pressure means and the upper quarters of beef are transferred to track 22 as described. Very little manual effort is required in these operations as will be apparent and the difficulties previously encountered are obviated. The entire procedure is accelerated by use of the apparatus, and manifestly, the operators are not fatigued as they would be in following the previous practice.

Although only one form of the invention has been illustrated and described in detail, it will be apparent to those skilled in the art that various modifications may be made without departing from the scope of the claims.

What is claimed is:

1. Apparatus for conveying meat comprising an upper conveyer track upon which roller-supported hanger hooks may move, a lower like conveyer track offset laterally from the upper track, the two tracks being so offset vertically and laterally from each other that a side of beef suspended at one end from a hanger on the upper track may have its other or lower end swung over and engaged with a hanger on the lower conveyer to enable cutting the side of beef transversely into quarters while the ends remain connected to the respective hangers, an auxiliary track adapted to be shifted from a position of alignment with one end of the offset upper track to a position of alignment with an end of the offset lower track so that the beef quarter suspended by the hanger on the upper track may be moved to the auxiliary track, then lowered to the lower track and shifted thereto so that both beef quarters then will be on the lower track, and means for supporting and moving the auxiliary track from one of said positions to the other.

2. Apparatus for conveying meat comprising an upper conveyer track adapted to support roller supported hangers for movement therealong, a similar lower conveyer track offset laterally and vertically therefrom so that a side of beef suspended at one end from a hanger on the upper track may have its lower end swung over to and engaged with a hanger on the lower track to enable cutting of the side of beef transversely into quarters while the ends remain connected to the respective hangers, an auxiliary track adapted to be shifted from a position of alignment with one end of one of said tracks to a position of alignment with one end of the other of said tracks, a pair of channel members disposed in inclined, spaced and parallel relation and the channel openings of which present toward one another, a cross-head disposed at right angles to said channel members and the end portions of which are slidably received in said channel members for movement therealong, means supporting said auxiliary track on said cross-head, and means for moving said cross-head along said inclined channel members between one position in which said auxiliary track is disposed in alignment with said one end of said upper track and another position in which said auxiliary track is disposed in alignment with said one end of said lower track so that a beef quarter suspended by a hanger on said upper track may be moved to said auxiliary track then lowered to said lower track and shifted thereto.

3. An elevator structure for transferring hangers adapted to carry meat, from an upper fixed track to a lower parallel fixed track spaced below and offset laterally therefrom so that a side of beef suspended at one end from a hanger on said upper track may have its other end swung over to and engaged with a hanger on the lower track to enable cutting the side of beef transversely into quarters, said elevator structure comprising a pair of similar channel members, means for supporting said channel members in inclined, spaced, parallel relation with their open sides presenting toward each other, a cross-head disposed at right angles to said channel members and having its end portions slidably received in said channel members, an auxiliary track mounted on said cross-head, and means for sliding said cross-head along said inclined channel members between a first position in which said auxiliary track is adapted to be aligned with one end of said upper track and a second position in which said auxiliary track is adapted to be aligned with one end of said lower track.

ERNEST R. ORLING.

REFERENCES CITED

The following references are of record in the file of this patent:

UNITED STATES PATENTS

| Number | Name | Date |
|---|---|---|
| 1,150,003 | Focardi | Aug. 10, 1915 |
| 1,857,840 | Drake | May 10, 1932 |
| 1,927,678 | Bennington | Sept. 19, 1933 |
| 2,035,355 | Wise | Mar. 24, 1936 |
| 2,035,359 | Anjeskey | Mar. 24, 1936 |

FOREIGN PATENTS

| Number | Country | Date |
|---|---|---|
| 204,754 | Germany | Dec. 2, 1908 |